E. Rice,
Shackle,

N° 84,303.     Patented Nov. 24, 1868.

Witnesses:
W. J. Cambridge
Ch. N. Robbins

Inventor:
Eli Rice Per his Attorneys
Teschemacher & Stearns

ELI RICE, OF WEST NORTHFIELD, ASSIGNOR TO HIMSELF AND N. H. RICHARDSON, OF FITCHBURG, MASSACHUSETTS.

Letters Patent No. 84,303, dated November 24, 1868.

IMPROVEMENT IN DEVICE FOR PREVENTING HENS FROM SCRATCHING.

The Schedule referred to in these Letters Patent and making part of the same.

*To all whom it may concern:*

Be it known that I, ELI RICE, of West Northfield, in the county of Franklin, and State of Massachusetts, have invented a Device for Preventing Fowls from Scratching, of which the following is a full, clear, and exact description, reference being had to the accompanying drawings, making part of this specification, in which—

To provide a simple means for preventing fowls from scratching the ground, and removing seed therefrom during planting-time, and from marring the smooth and finished appearance of garden-plots, is the object of my invention, consisting in a clog or plate, provided with an opening near one end, for the reception of the leg of the fowl, the other end terminating in a point, so that when a fowl provided with this device attempts to scratch, the forward movement of the leg will serve to draw the point forward, and on the backward movement of the leg the point will enter the ground, and the fowl be tilted or impelled forward, and thus be prevented from scratching.

To enable others skilled in the art to understand and use my invention, I will proceed to describe the manner in which I have carried it out.

In the said drawings, A represents a plate or clog, in the larger end of which is formed an opening, $a$, into which the leg of the fowl is to be inserted, which may be readily done by folding the claws together. The opposite end of this plate inclines slightly downward, and terminates in a point, $b$. The plate is intended to be so placed as to bring the point in the rear of the fowl.

Figure 1:
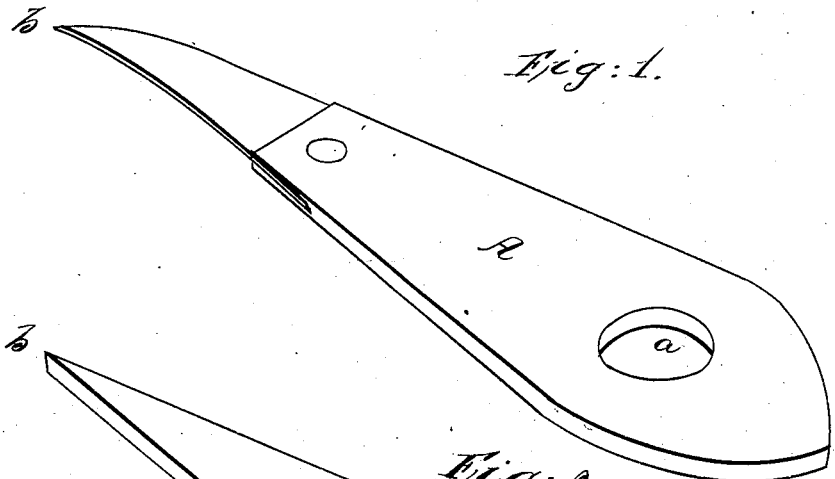
Figures 1 and 2 are perspective views, representing my improved devices.
Figure 2:
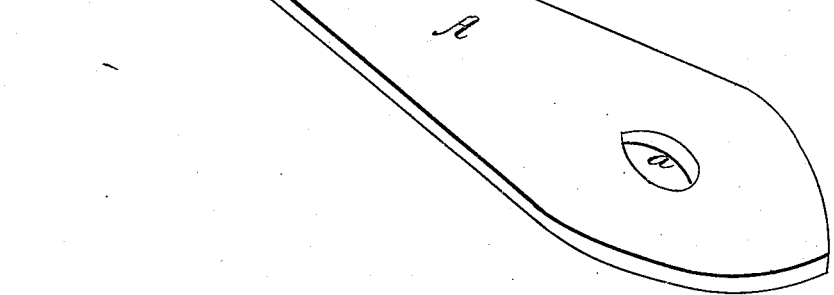
Figure 3:
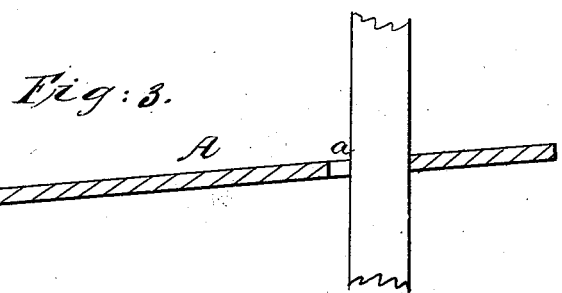
Figure 3 is a longitudinal section through the centre of the same.

In fig. 1 the plate is provided with a metallic point, while in fig. 2 the point is made in one and the same piece as the plate.

A fowl, when provided with my improved clogs, is prevented from scratching, as the forward and upward movement of the leg will draw the point forward, so as to cause it to enter the ground on the downward and backward movement of the leg, which thus operates to throw the fowl forward, away from the place where it intended to scratch.

Instead of the construction above described, the opening $a$ may be dispensed with, and the clog attached in its proper position upon the fowl's leg by means of a string or wire.

Claim.

What I claim as my invention, and desire to secure by Letters Patent, is—

The within-described device for preventing fowls from scratching.

ELI RICE.

Witnesses:
 RICHARD COLTON,
 E. WELLS COLTON.